(12) United States Patent
Tico et al.

(10) Patent No.: US 8,310,436 B2
(45) Date of Patent: Nov. 13, 2012

(54) POWER SUPPLY CONTROLLER FOR MULTIPLE LIGHTING COMPONENTS

(75) Inventors: Olivier Tico, Toulouse (FR); Ludovic Oddoart, Frouzins (FR); Cor Voorwinden, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 366 days.

(21) Appl. No.: 12/597,021

(22) PCT Filed: Apr. 27, 2007

(86) PCT No.: PCT/IB2007/052685
§ 371 (c)(1),
(2), (4) Date: Oct. 22, 2009

(87) PCT Pub. No.: WO2008/132562
PCT Pub. Date: Nov. 6, 2008

(65) Prior Publication Data
US 2010/0117562 A1    May 13, 2010

(51) Int. Cl.
*G06F 3/033* (2006.01)
(52) U.S. Cl. ............ 345/102; 345/99; 345/82; 345/212; 345/204

(58) Field of Classification Search .................. 315/247, 315/224, 291, 307–326; 345/204, 211, 212, 345/214, 76, 77, 82, 99, 102
See application file for complete search history.

(56) References Cited

U.S. PATENT DOCUMENTS
2002/0105373 A1    8/2002   Sudo
2007/0145914 A1    6/2007   Hong et al.

FOREIGN PATENT DOCUMENTS
EP    1691581 A     8/2006
KR    20070000963 A    1/2007

OTHER PUBLICATIONS

International Search Report and Written Opinion correlating to PCT/IB2007/052685 dated Dec. 20, 2007.

*Primary Examiner* — Tuyet Thi Vo

(57) ABSTRACT

A power supply controller for a plurality of lighting components in a battery-powered apparatus. The power supply controller comprises a current source common to the lighting components, and a sequencer for coupling the current source sequentially to each of the lighting components with a repetition rate substantially faster than the flicker perception rate. Each of the lighting components comprises a respective array of lighting elements connected in series to receive the same current as the other lighting elements of the same lighting component.

20 Claims, 3 Drawing Sheets

| | Implementation | Mismatch in Same Zone | Mismatch between Zones | Simultaneous Use of Zones | Efficiency including Boost | # Pins Boost + 3 Zones | Relative Area |
|---|---|---|---|---|---|---|---|
| 1 | Parallel LEDs Fixed Boost 5V | 3% | 5% | YES | 60 % | 3 + 7 | 1 |
| 2 | Parallel LEDs Adaptive Boost | 3% | 5% | YES | 80 % | 3 + 7 | 1 |
| 3 | Serial LEDs Fixed Boost | 0% | 5% | NO | 80 % | 3 + 3 | 0.5 |
| 4 | Serial LEDs Adaptive Boost | 0% | 5% | NO | 90% | 2 + 3 | 0.5 |
| 5 | Serial LEDs Adaptive Boost, Time Sharing | 0% | 1% | YES | 90% | 2 + 3 | 0.4 |

POWER SUPPLY CONTROLLER FOR MULTIPLE LIGHTING COMPONENTS

FIELD OF THE INVENTION

This invention relates to a power supply controller for multiple lighting components and to battery-powered apparatus including a plurality of lighting components and a power supply controller for the lighting components. The apparatus is particularly applicable to portable apparatus such as a portable telephone but is also applicable to other applications, such as portable digital assistants, music or multimedia players, navigation devices and portable television receivers, for example, and also to non-portable devices.

BACKGROUND OF THE INVENTION

Communication devices especially, but also other battery-powered devices, frequently include multiple lighting components in conjunction with visual displays and for other purposes. In the case of a portable telephone, for example, the telephone may include a main display and a keyboard backlight. In the case of a 'clam shell' type of telephone, where the main display is positioned inside a hinged cover that folds down over the keyboard when not in use, an auxiliary display of smaller size for displaying reduced information is often also provided on the outside of the cover.

The main and auxiliary displays typically comprise image displays, each of which defines an image in a layer for reflection and transmission of light. The image is visible by reflection of ambient light but a light emitting component is provided behind the image layer as a backlight to improve the image visibility by illuminating the image and transmission of light through the image layer. The image layer may comprise a liquid crystal display and the backlight may comprise a plurality of light emitting diodes ('LED's), for example. Such a configuration provides an effective display with low power consumption, particularly desirable in the case of battery powered portable devices.

The different lighting components are capable of being activated independently and each lighting component includes typically a plurality of light emitting elements in an array.

The quality of the lighting is judged by a number of criteria. Among the typical criteria are:
- the uniformity of the lighting, especially within the main display, which requires all the lighting elements in the same array to be supplied with well-matched currents, but also between one lighting component and another,
- low power consumption, which requires an efficient power supply, with a DC-DC converter, for example, and adapting the power supply voltage to reduce voltage drop in the drivers ('headroom' control), and
- independent luminosity control for the different lighting arrays, which requires independent programming of the power supply currents for the different lighting arrays.

Known lighting controller systems that address some or all of the above issues tend to suffer from some or all of the following drawbacks:
- large semiconductor die area, especially if a parallel driver is used with an individual current source for each of the LEDs of the arrays in parallel,
- high pin count of the integrated circuit, especially if individual current sources are provided for each LED in the lighting arrays,
- limitation of the possible usage cases, especially if more than one lighting component cannot be active simultaneously or if the luminosity of different arrays is too different (the use of separate boost converters for different lighting arrays is excluded as requiring multiplication of costly self-inductances), and
- limited efficiency, especially if the driver has no headroom control.

The present invention has as objective to avoid or alleviate some or all of the above drawbacks while providing an improved quality of lighting.

SUMMARY OF THE INVENTION

The present invention provides a power supply controller for multiple lighting components and to apparatus including a plurality of lighting components and a power supply controller for the lighting components as described in the accompanying claims.

DETAILED DESCRIPTION OF THE PREFERRED EMBODIMENTS

The invention will be described by way of example as applied to a portable telephone. However, it will be appreciated that the invention is also applicable to other portable apparatus such as portable digital assistants, music or multimedia players, navigation devices and portable television receivers, for example, and also to non-portable devices.

Figure 1:
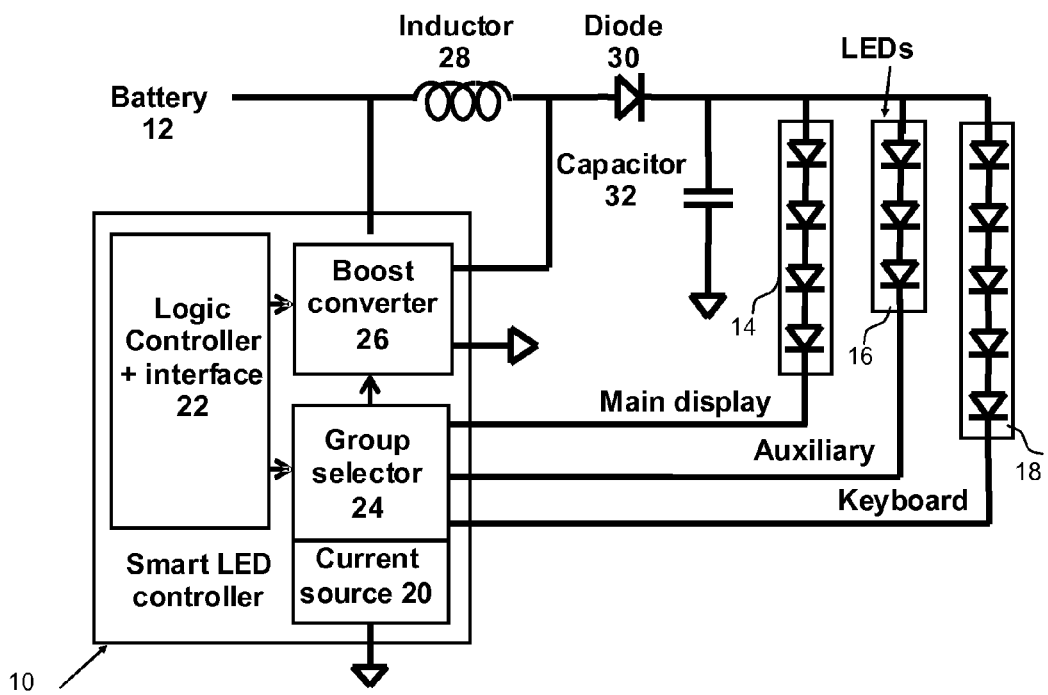
FIG. 1 is a block schematic diagram of a portable telephone having a power supply controller for multiple lighting components in accordance with one embodiment of the invention, given by way of example.
Figure 2:
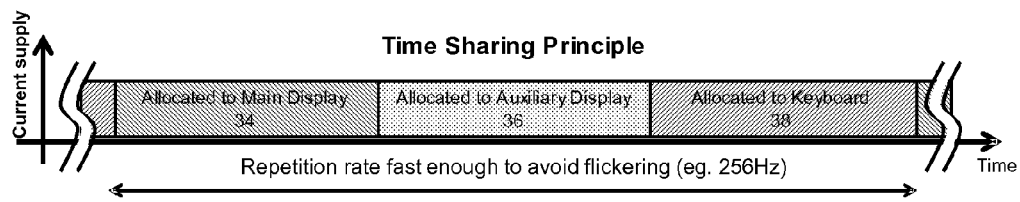
FIG. 2 is a schematic illustration of a cycle of supply of current to the respective lighting components in operation of the telephone of FIG. 1.

The telephone shown in FIG. 1 comprises a power supply controller 10 for controlling the supply of power from a battery 12 to respective light emitting components comprising respective groups of light emitting diodes ('LED's) 14, 16 and 18. In this telephone, the groups of LEDs 14, 16 and 18 are arrays used as backlights respectively for a main display, an auxiliary display and a keyboard (not shown) of the telephone.

The power supply controller 10 comprises a current source 20 for providing a defined intensity of current, the current source being common to all the groups of lighting components 14, 16 and 18. The power supply controller 10 also comprises a sequencer, including a logic controller and interface 22 and a group selector 24 for connecting the current source sequentially to supply current to each of the groups of lighting components 14, 16 and 18 in turn.

The power supply controller 10 also includes a boost converter 26, which controls the voltage applied in turn to the respective groups of LEDs 14, 16 and 18 so as to maintain a desired voltage across the group selector 24 and the current source 20 whichever group is selected by the sequencer. The group selector 24 includes a multiplexer (not shown) that feeds back to the boost converter 26 the voltage appearing at the connection between the selected group of lighting components 14, 16 or 18 and the group selector 24 so that the boost converter adjusts this voltage to the desired value (adaptive boost). The power supply controller 10 is itself supplied with power by the battery 12. An inductor 28 and a diode 30 are connected in series in the power supply line between the battery 12 and the groups of LEDs 14, 16 and 18, the boost converter 26 is connected to the power supply line between the inductor 28 and the diode 30, and a capacitor 32 is connected from the connection between the diode 30 and the groups of LEDs 14, 16 and 18 to ground. The polarity of the diode 30 is such as to prevent current flowing back from the capacitor 32 to the boost converter 26 and inductor 28.

The lighting components 14, 16 and 18 form respective arrays of lighting elements connected electrically in series. Accordingly, each lighting element of the same array receives an exactly identical current and the luminosities of all the lighting elements within the same array are well matched.

In operation, the sequencer comprising the logic controller and interface 22 and the group selector 24 connects the current source sequentially to the respective groups of LEDs 14, 16 and 18 on a time sharing basis, as selected by the group selector 24. The use of a common current source facilitates good matching of the luminosities between the respective groups of LEDs 14, 16 and 18, the current source 20 ensures a constant current for each of the groups of LEDs 14, 16 and 18 as long as the voltage provided is above a threshold value. The repetition rate of the cycle of time sharing is substantially greater than the rate at which flicker can be perceived (of the order of 70 Hz). In one embodiment of the invention the repetition rate of the cycle of time sharing is greater than 100 Hz; in the embodiment of the invention shown in FIG. 1, the repetition rate of the cycle of time sharing is 256 Hz. In this embodiment of the invention the time for current supply to the respective groups of LEDs 14, 16 and 18 is shared equally.

The voltage appearing at the connection between the selected group of lighting components 14, 16 or 18 and the group selector 24 is controlled independently. The boost converter 26 pulses the current supplied through the inductor 28 and diode 30 to the capacitor 32 at a repetition rate (for example 2 MHz) much higher than the time sharing cycle. The voltage across the capacitor 32 is regulated as a function of the feedback from the group selector 24 by applying pulse width modulation to the pulse with a duty cycle that is chosen to give the desired average voltage during the time slot that is allocated to the particular array of LEDs.

The current source 20 can be parametered to regulate the current in the selected group of LEDs 14, 16 or 18 at a desired value. In addition, the on-time of the current during the time slot allocated to the group can be regulated by the logic controller 22. In this way, two possibilities for regulating and controlling the average current in the selected group of LEDs 14, 16 or 18 are available.

Figure 3:
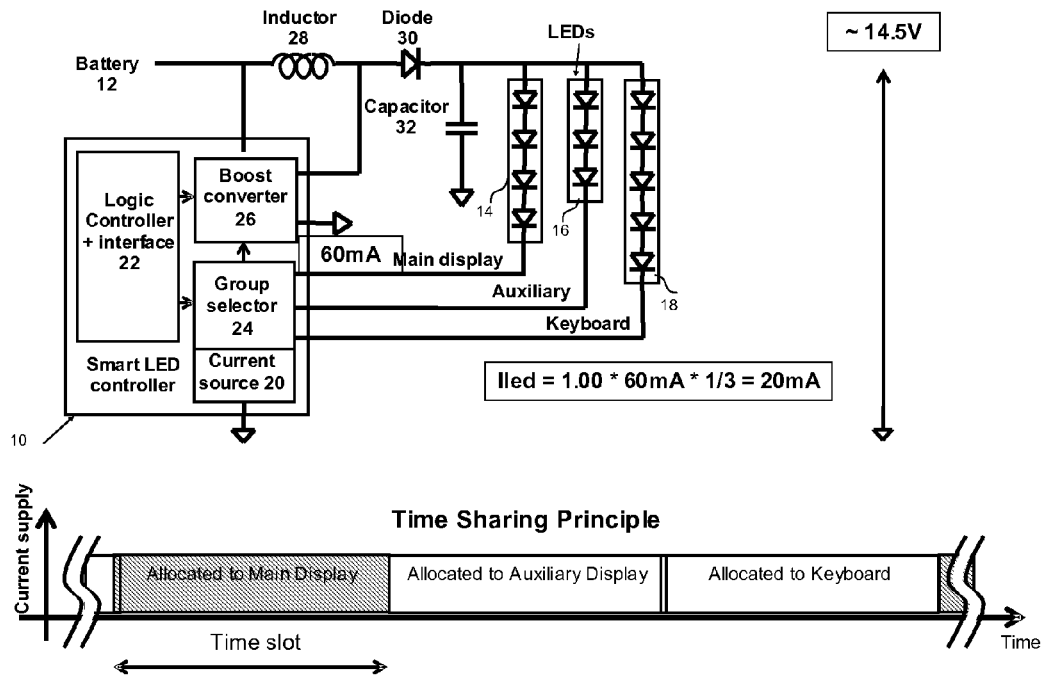
FIG. 3 is a block schematic diagram of the portable telephone of FIG. 1 showing the supply of current to lighting components of a main display during its operation.

In an example shown in FIG. 3 by way of illustration, the array 14 of LEDs for the main display is supplied with a current of 60 mA during the asserted pulses of the modulation. In this example, the on-time of the current is chosen to be 100% of the duration of the time slot. Accordingly, the average current received by the array 14 of LEDs during its ⅓ share of the time slots of a number of time sharing cycles is:

$$60mA * 100\% * \tfrac{1}{3} = 20mA.$$

Figure 4:
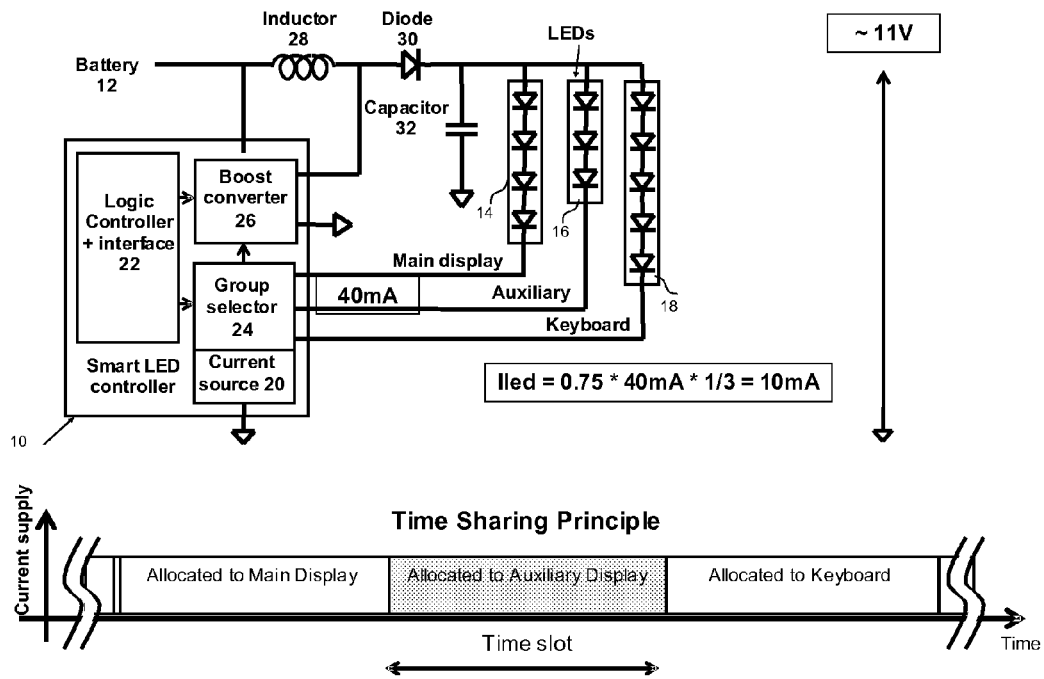
FIG. 4 is a block schematic diagram of the portable telephone of FIG. 1 showing the supply of current to lighting components of an auxiliary display during its operation.

In an example shown in FIG. 4 by way of illustration, the array 16 of LEDs for the auxiliary display is supplied with a current of 40 mA during the asserted pulses of the modulation. In this example, the on-time of the current is chosen to be 75% of the duration of the time slot. Accordingly, the average current received by the array 16 of LEDs during its ⅓ share of the time slots of a number of time sharing cycles is:

$$40mA * 75\% * \tfrac{1}{3} = 10mA.$$

While FIGS. 3 and 4 show the time slots with equal duration for the different groups of LEDs 14, 16 and 18, it will be appreciated that different durations can be chosen for the different groups, offering a further parameter for regulating the respective apparent luminosities.

FIGS. 3 and 4 show the time-sharing cycle as having three time slots. However it will be appreciated that the cycle may have fewer or more time slots. For example, even in a case where there are three lighting components 14, 16 and 18, as in FIGS. 3 and 4, the components may be powered at least partly in combination during cycles of only two time slots. In an example of the latter configuration, a combination consisting of the LEDs of the main display 14 and the LEDs of the keyboard 18 are powered during respective time slots of a first cycle and during a second, alternative, cycle a combination consisting of the LEDs of the auxiliary display 16 and some only of the LEDs of the keyboard 18 are powered during respective time slots.

The number of light emitting elements in the respective groups of LEDs 14, 16 and 18 differs. For example, a main display may have 4 backlight elements, while an auxiliary display has 2 or 3 backlight elements and a keyboard has 4 to 12 backlight elements. The voltage drop across a large number of LEDs connected in series, as in the embodiment of FIG. 1, is higher than for a small number because the threshold or drop-out voltages of the LEDs accumulate. The boost converter 26 adjusts the supply voltage applied to the LEDs as explained above so that the voltage across the group selector 24 and current source 20 adopts the desired value. In this way, the headroom is reduced, that is to say the voltage applied to the current source is reduced close to the threshold enabling the constant current supply to be maintained. More particularly, in the examples of FIGS. 3 and 4, where the main display has 4 backlight elements while the auxiliary display has 3, the array 14 for the main display is supplied at 14.5 V while the array 16 for the auxiliary display is supplied at 11 V.

Figures 5, 6:
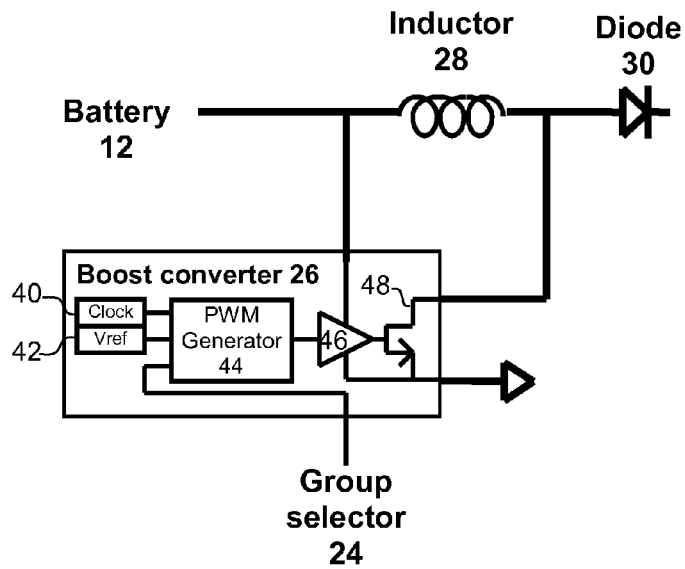
FIG. 5 is a more detailed block diagram of a boost converter in the telephone of FIG. 1.
FIG. 6 is a table showing quality parameters relating to the operation of the telephone of FIG. 1 compared to telephones that do not have all the features of the telephone of FIG. 1.

The boost converter 26 may take various forms. One example of a boost converter is shown in FIG. 5 and includes a clock 40 and a reference voltage generator 42 inputting to a pulse-width modulator 44, which receives the feedback signal from the group selector 24 at the voltage appearing at the connection between the selected group of lighting components 14, 16 or 18 and the group selector 24. The pulse-width modulator 44 compares this feedback signal with the reference voltage 42 and provides a signal to a driver 46. The driver 46 is connected to the gate of a transistor 48 whose source is connected to ground and whose drain is connected to the connection between the inductor 28 and the diode 30. In operation, the pulse repetition rate of the pulse-width modulator 44 is defined by the clock 40. The duty cycle is defined by the comparison in the pulse-width modulator 44 between the feedback voltage and the reference voltage.

FIG. 6 shows quality parameters relating to the operation of the telephone of FIG. 1 compared to telephones that do not have all the features of the telephone of FIG. 1, in the case where all the telephones have three backlight components.

In the telephone of row 1, the LEDs of each backlight component are connected in parallel to the power supply with a fixed voltage boost. It is found that tolerances and deviations of the LEDs themselves and their separate power supplies lead to mismatch (that is to say variations in luminosity) within the lighting zone of a given backlight component reaching 3%, which is sufficient to be noticeable for a user and undesirable. Simultaneous use of the different backlight components is possible, but the mismatch between the lighting zones of different backlight components may reach 5%, which can be undesirable, especially if the different backlight components are simultaneously visible to the user, for example if two (or more) are used simultaneously to illuminate different zones of the same image. In the telephone of row 1, the boost voltage is fixed at 5 volts and suited to another application (for example supply of a Universal Serial Bus 'USB') the efficiency of the power supply (power applied to the LEDs relative to power supplied by the battery 12) is only 60%. Also it is necessary to provide 10 pins, 3 pins for the boost (since the voltage across the LEDs has to be fed back in addition to the ground and battery connections) and 7 for the 3 backlight components (even if the number of current sources is reduced by forming sub-groups of LEDs, which itself presents certain disadvantages). The relative area of the die is 1 on an arbitrary scale.

In the telephone of row 2, the LEDs of each backlight component are again connected in parallel to the power supply but with a boost suited to the LED arrays. It is found the mismatch within the lighting zone of a given backlight component is again 3% and the mismatch between the lighting zones of different backlight components again may reach 5%. In the telephone of row 2, since the boost voltage is suited to the voltage drop across the LEDs, the efficiency of the power supply can reach 80%. It is still necessary to provide 10 pins. The relative area of the die is again 1 on the same scale.

In the telephone of row 3, the LEDs of each backlight component are connected in series to the power supply with a fixed boost voltage. It is found the mismatch within the lighting zone of a given backlight component is now essentially 0%, since each LED of the same backlight component receives an identical current. However, the tolerances and deviations of the separate power supplies of the LEDs lead to mismatch between the lighting zones of different backlight components which again may reach 5%. In the telephone of row 3, the boost voltage is fixed and sufficient for the backlight component with the greatest number of LEDs, but since there are only three arrays of LEDs to be supplied in the lighting components, the efficiency of the power supply can reach 80%. It is only necessary to provide 6 pins, 3 pins for the boost and 3 for the 3 backlight components. The relative area of the die is reduced to 0.5 on the same scale. It is not possible to use two or more of the lighting components simultaneously because the boost and current source is switched alternatively to one or the other of the groups of LEDs.

In the telephone of row 4, the LEDs of each backlight component are again connected in series to the power supply but with a boost voltage that can adapt to the different groups of LEDs. Again, the mismatch within the lighting zone of a given backlight component is essentially 0%, since each LED of the same backlight component receives an identical current and the mismatch between the lighting zones of different backlight components may again reach 5%. In the telephone of row 4, the boost voltage is adaptive, so that different voltages can be supplied suited to the different numbers of LEDs in the different groups: the efficiency of the power supply can reach 90%. It is only necessary to provide 5 pins, 2 pins for the boost (since the feedback voltage can be obtained internally of the controller from the current sources) and 3 for the 3 backlight components. The relative area of the die is again 0.5 on the same scale. It is again not possible to use two or more of the lighting components simultaneously because the boost and current source is switched alternatively to one or the other of the groups of LEDs.

In the telephone of FIG. 1 and row 5 of FIG. 6, the LEDs of each backlight component are again connected in series to the power supply. Again, the mismatch within the lighting zone of a given backlight component is essentially 0%, since each LED of the same backlight component receives an identical current. However the same voltage generator and current supply is used in turn on a time sharing basis for the three different backlight components, the mismatch between the lighting zones of different backlight components is reduced to only 1%. In the telephone of row 5, the boost voltage is again adaptive and the efficiency of the power supply can again reach 90%. It is again only necessary to provide 5 pins, 2 pins for the boost and 3 for the 3 backlight components. The relative area of the die is again 0.4 on the same scale. It is possible to use two or more of the lighting components simultaneously as perceived by the user due to his persistence of vision.

The invention claimed is:

1. A method comprising:
    coupling, via a sequence, a current source sequentially to each of multiple groups of light emitting diodes during respective allocated time slots with a repetition rate substantially faster than a flicker perception rate, wherein each of the multiple groups of light emitting diodes include a respective array of light emitting diodes connected in series, wherein the current source is common to the multiple groups of light emitting diodes;
    applying, via a pulse width modulator, pulse width modulation during the allocated time slots with a controlled duty cycle, for controlling an average current applied to the corresponding group of light emitting diodes.

2. A power supply controller for a plurality of lighting components, each of said lighting components comprising a respective array of lighting elements connected in series to receive the same current as the other lighting elements of the same lighting component, in a battery-powered apparatus, the power supply controller comprising:
    a current source common to said lighting components;
    a sequencer for coupling said current source sequentially to first and second ones of said lighting components during respective allocated time slots with a repetition rate substantially faster than a flicker perception rate; and
    a pulse width modulator for applying pulse width modulation during said allocated time slots with a controlled duty cycle, for controlling an average current applied to the corresponding lighting components.

3. Battery-powered apparatus including a power supply controller as claimed in claim 2 and said lighting components and said first and second lighting components having different numbers of said elements.

4. A power supply controller as claimed in claim 2, wherein said current source is arranged to control intensities of current supplied to said lighting components, whereby to control the perceived luminosity of the respective lighting components.

5. Battery-powered apparatus including a power supply controller as claimed in claim 4 and said lighting components and said first and second lighting components having different numbers of said elements.

6. A power supply controller as claimed in claim 2, wherein said power supply controller comprises voltage controlling means for controlling a voltage applied across said lighting components and said current source.

7. Battery-powered apparatus including a power supply controller as claimed in claim 1 and said lighting components and said first and second lighting components having different numbers of said elements.

8. Battery-powered apparatus including a power supply controller as claimed in claim 6 and said lighting components and said first and second lighting components having different numbers of said elements.

9. A power supply controller as claimed in claim 6, wherein said sequencer is arranged to control an on-time during said allocated time slots as a proportion of their respective durations, whereby to control the perceived luminosity of the respective lighting components.

10. A power supply controller as claimed in claim 9, wherein said sequencer is arranged to control respective durations of said allocated time slots, whereby to control the perceived luminosity of the respective lighting components.

11. A power supply controller as claimed in claim 6, wherein said current source is arranged to control intensities of current supplied to said lighting components, whereby to control the perceived luminosity of the respective lighting components.

12. Battery-powered apparatus including a power supply controller as claimed in claim 11 and said lighting components and said first and second lighting components having different numbers of said elements.

13. A power supply controller as claimed in claim 2, wherein said sequencer is arranged to control an on-time during said allocated time slots as a proportion of their respective durations, whereby to control the perceived luminosity of the respective lighting components.

14. A power supply controller as claimed in claim 13, wherein said sequencer is arranged to control respective durations of said allocated time slots, whereby to control the perceived luminosity of the respective lighting components.

15. Battery-powered apparatus including a power supply controller as claimed in claim 13 and said lighting components and said first and second lighting components having different numbers of said elements.

16. A power supply controller as claimed in claim 15, wherein said sequencer is arranged to control respective durations of said allocated time slots, whereby to control the perceived luminosity of the respective lighting components.

17. A power supply controller as claimed in claim 13, wherein said current source is arranged to control intensities of current supplied to said lighting components, whereby to control the perceived luminosity of the respective lighting components.

18. A power supply controller as claimed in claim 17, wherein said sequencer is arranged to control respective durations of said allocated time slots, whereby to control the perceived luminosity of the respective lighting components.

19. Battery-powered apparatus including a power supply controller as claimed in claim 13 and said lighting components and said first and second lighting components having different numbers of said elements.

20. A power supply controller as claimed in claim 19, wherein said sequencer is arranged to control respective durations of said allocated time slots, whereby to control the perceived luminosity of the respective lighting components.

* * * * *